April 5, 1927.

V. V. MESSER

1,623,354

MACHINE FOR CUTTING BIAS STRIPS

Filed Feb. 28, 1924    8 Sheets-Sheet 2

April 5, 1927.  
V. V. MESSER  
1,623,354  
MACHINE FOR CUTTING BIAS STRIPS  
Filed Feb. 28, 1924  
8 Sheets-Sheet 4

April 5, 1927.

V. V. MESSER

1,623,354

MACHINE FOR CUTTING BIAS STRIPS

Filed Feb. 28, 1924

April 5, 1927.                         1,623,354
V. V. MESSER
MACHINE FOR CUTTING BIAS STRIPS
Filed Feb. 28, 1924      8 Sheets-Sheet 7

WITNESSES
Oliver W. Holmes

INVENTOR
Vladimir V. Messer
BY
Knight Bros
ATTORNEYS

April 5, 1927.  
V. V. MESSER  
1,623,354  
MACHINE FOR CUTTING BIAS STRIPS  
Filed Feb. 28, 1924  8 Sheets-Sheet 8

Patented Apr. 5, 1927.

1,623,354

UNITED STATES PATENT OFFICE.

VLADIMIR V. MESSER, OF DOUGLASTON, NEW YORK.

MACHINE FOR CUTTING BIAS STRIPS.

Application filed February 28, 1924. Serial No. 695,727.

This invention relates to machines for cutting friction fabrics into bias strips, such for example as are used in the manufacture of pneumatic tires. Machines used for this purpose may conveniently be divided into two classes: those which feed the fabric intermittently and cut only when the fabric is at rest and those which feed and cut the fabric continuously. The present invention belongs to the latter class.

In machines using the continuous method, it has been customary to make use of a helical knife mounted on a drum and rotating in rolling contact with another drum so that as the fabric passes between the drum and the helical knife, it is continuously cut into a series of bias strips. The pitch of the helix and the diameter of the roll upon which it is mounted determine the angle of the bias and the width of the bias strips. Obviously, a separate drum must be used for each separate width or for each separate angle of strip. The consequent objectionable accumulation of special cutting drums is heightened by the costly nature of the helical knives and the difficulty of keeping them in condition.

In the improved machine described herein, the fabric, while passing in contact with the main feeding roll, is cut into bias strips by means of disk cutters rotating in contact with the feeding roll and carried continuously in one direction along the length of the roll by suitable mechanism so geared to the feeding roll as to move synchronously therewith, the cutters being set at a proper angle and being also properly spaced apart as to cut bias strips of any desired width or angle, the variation in angle being accomplished by merely changing the angle of the cutters with respect to the axis of the drum and the ratio between the speed of the drum and cutters and the variation in width of the strips being accomplished by simply changing the distance that the cutters are set apart on the driving mechanism.

Other novel details of the invention will appear in the following description, made with reference to the accompanying drawings, in which—

Figure 13[a] shows a fragment of the bias strip with the printed scale thereon.

Figure 7:
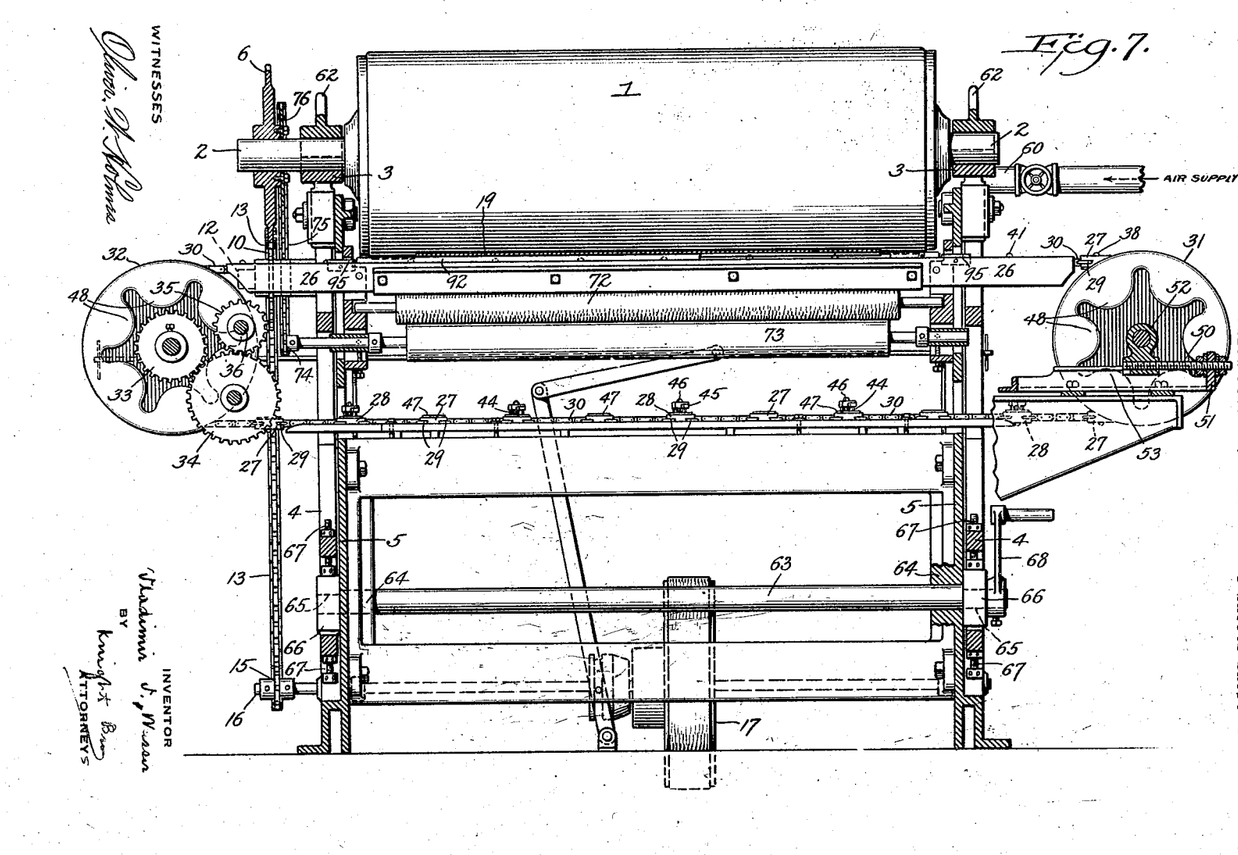
Figure 7 is a transverse vertical section on line 7—7 of Figure 1.
Figure 8:
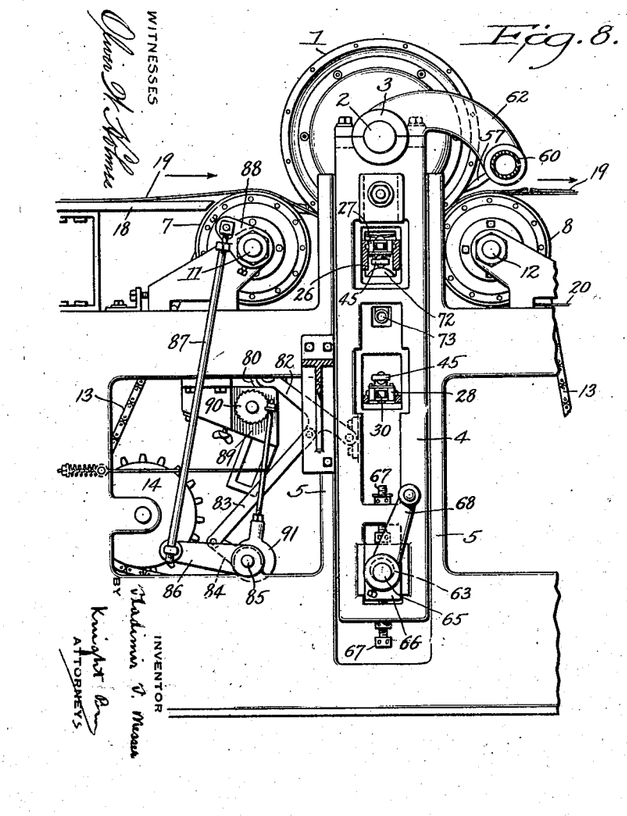
Figure 8 is a side elevation showing the drum lifting mechanism.
Figure 9:
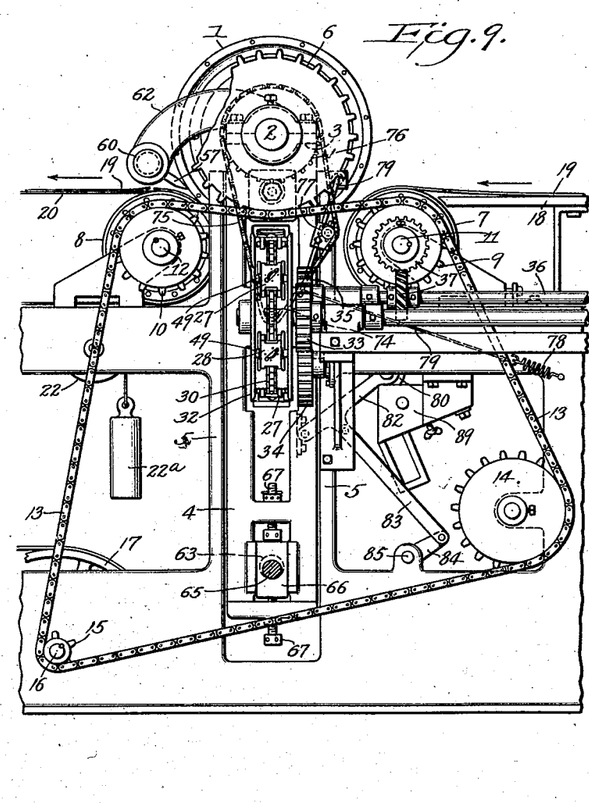
Figure 9 is a corresponding side elevation of the opposite side of the machine.
Figure 10:
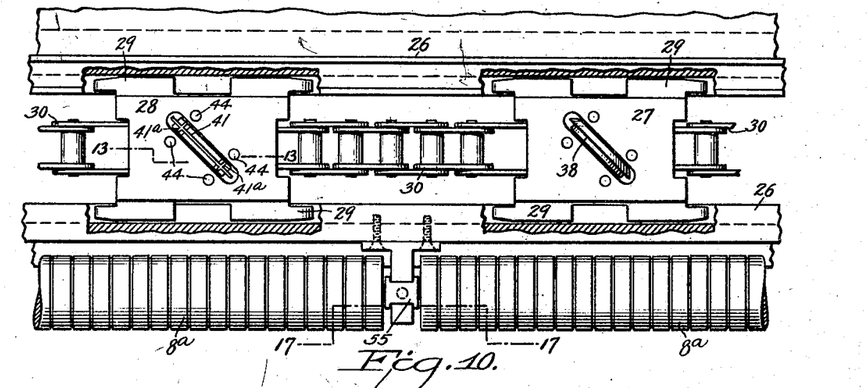
Figure 10 is a fragmentary plan view of the cutter carriers and the leading-out rolls.
Figure 11:
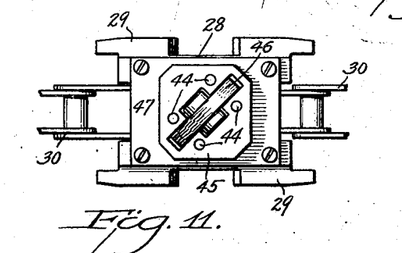
Figure 11 is a view from below of the inking disk and its carrier.
Figure 12:
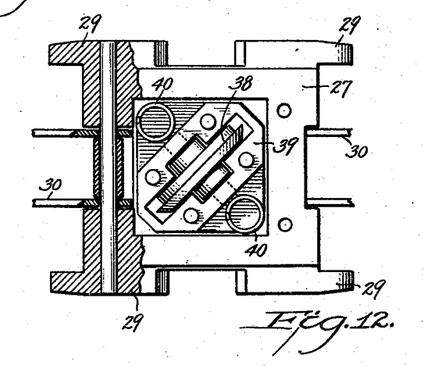
Figure 12 is a view from below of a cutter and its carrier.
Figure 13:
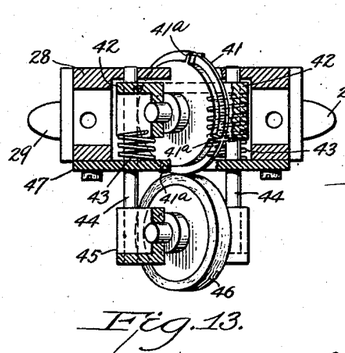
Figure 13 is a partial vertical section on line 13—13 of Figure 10, of the printing disk and its inking disk.
Figure 13A:
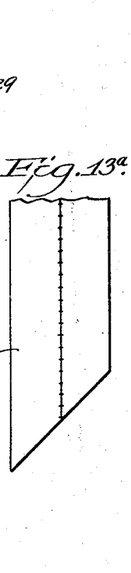
Figure 14:
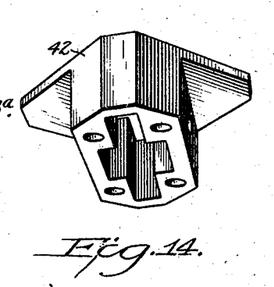
Figure 14 is a detail of the carrier body.
Figure 15:
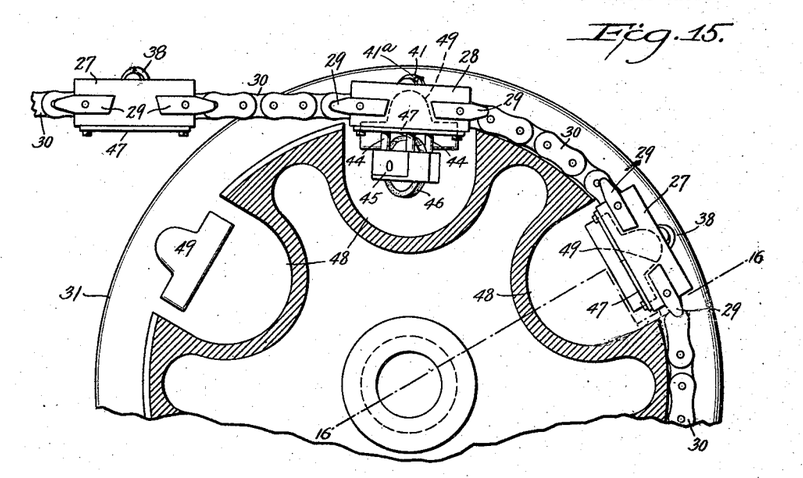
Figure 15 is a detail view of the sprocket wheel in section and the cutter carrier.
Figure 16:
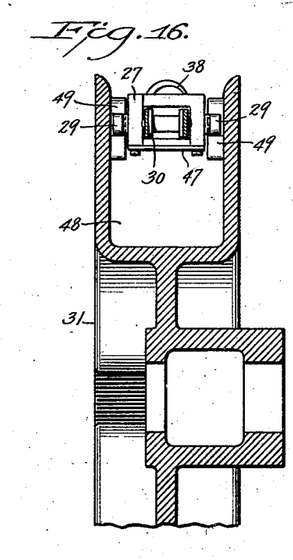
Figure 16 is a section of the sprocket wheel and cutter carrier on line 16—16 of Figure 15.

Referring to the drawings, an iron cylinder or roll 1, having a polished and hardened surface, has its shaft 2 mounted in journal bearings 3, which are located at the upper extremities of bearing supports 4, which are slidably mounted between guides 5 in the two side frames of the machine. The shaft at one end of the roll has mounted upon it a driving sprocket 6. Two auxiliary feed rolls 7 and 8 (see Figure 4) straddle the lower part of the roll and sprockets 9 and 10 respectively are mounted on their shafts 11 and 12. A chain 13 passes over the sprocket wheels 9 and 10, under the sprocket wheel 6 and around idler sprocket 14 (see Figure 9) and driving sprocket 15. Sprocket 15 is mounted on driving shaft 16, upon which also is a drive pulley 17 (see Figure 4). A feeding table 18 serves as a support for the fabric 19, which from the table, is led over roll 7, under roll 1 and over roll 8, and onto any suitable delivery means, which, in this embodiment, is shown as a number of cables 20. The cable supports 20 are made of one continuous cable which is wound over roll 8 alternately in suitable grooves cut in its surface for this purpose, and thence over an end roll 21 until it comes to the end of the roll when it passes over idler pulleys 23, 24 and 25 to return to the starting point at the other end of the rolls. The tension is maintained by means of a weight 22$^a$ with a cable passing over an idler pulley 22 and connected by a yoke to idler pulley 23. In the space immediately under the roll 1 and between the rolls 7 and 8 are guides 26 (see Figures 7 and 21) which extend from one end of the roll to the other and are adapted to form guides for cutter carriers 27 and printing roll carriers 28. The said carriers have side lugs 29, which slide in grooves in the guides. These carriers are connected by chain links 30 into a continuous chain element. The chain and its carriers are carried by sprocket wheels 31 and 32 (see Figure 7) and one of them, 32, has a gear 33 meshing with gears 34 and 35, the latter being mounted on a shaft 36, driven by spiral gears 37 from the shaft of drum 7. By these means, the chain and its carriers have a longitudinal motion along the cylinder imparted to it, which is synchronous with the rotation of the roll 1. The cutter carrier has mounted within it a disk cutter 38 journalled in a block 39 (see Figure 12) which is capable of free play vertically in the cutter carrier and is pushed outwardly by spiral springs 40 so as to cause the cutter to impinge against the lower surface of the roll 1. The printing disks 41 (see Figure 13) are likewise journalled in a vertically movable block 42 which is forced outward by springs 43 similar to the springs 40 for the cutters but much lighter in tension, whereby the printing disk 41 is held in contact with the under surface of the fabric. The block 42 has depending rods 44 which support a lower block 45, in which is journalled an inking disk 46 so that the disk 46 remains in continuous rolling contact with the printing disk 41. Cover plates 47 (see Figure 13) limit the outward motion of the cutter carrier blocks and the inking disk carrier blocks when they pass beyond the end of the roll 1. As shown in Figure 15, the sprocket wheels carrying the chain 30 and its connected carriers have pockets 48 for receiving the carriers and the sprockets are also provided with properly shaped teeth 49 adapted to engage between the lugs 29 of the carriers. Take-up screws 50 (see Figures 1 and 7) furnish a means of taking up slack of the chain, said screws being mounted in supports 51 and screwing into slidable bearing blocks 52 that carry the shaft of the sprocket wheel 31 on guides 53 suitably mounted on the frame of the machine.

Figure 1:
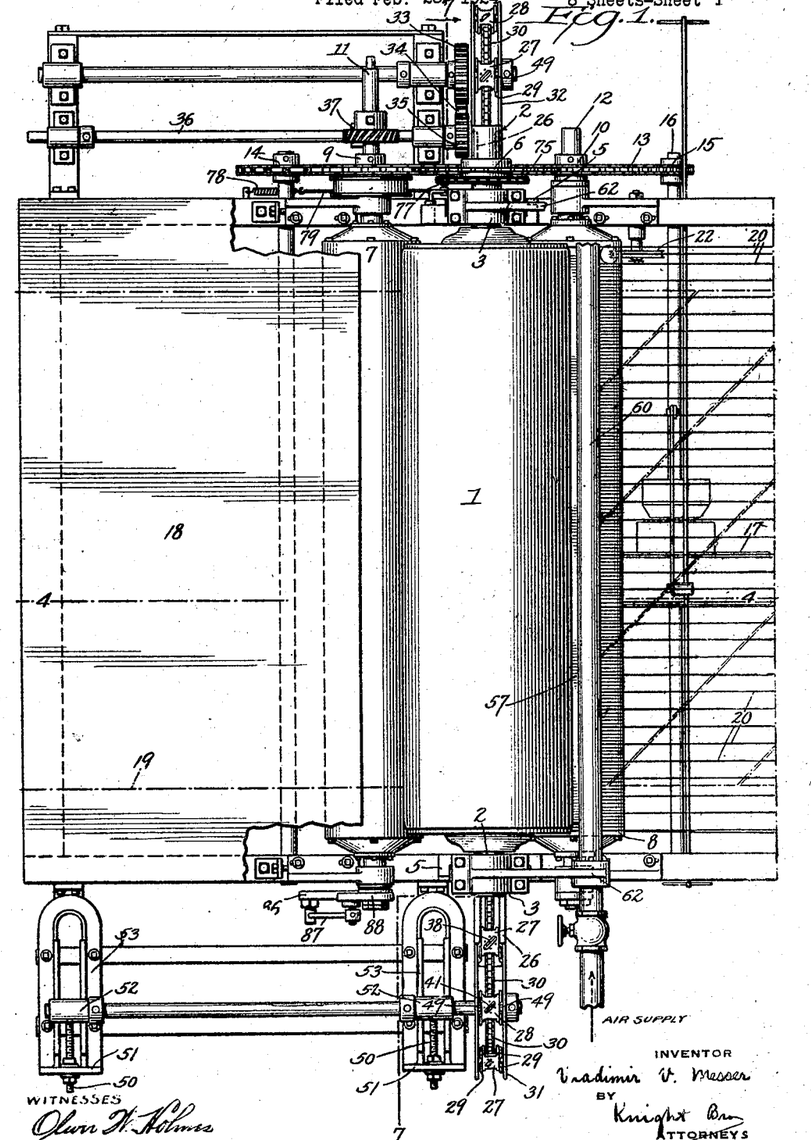
Figure 1 is a partial plan view of the main part of the machine.
Figure 2:
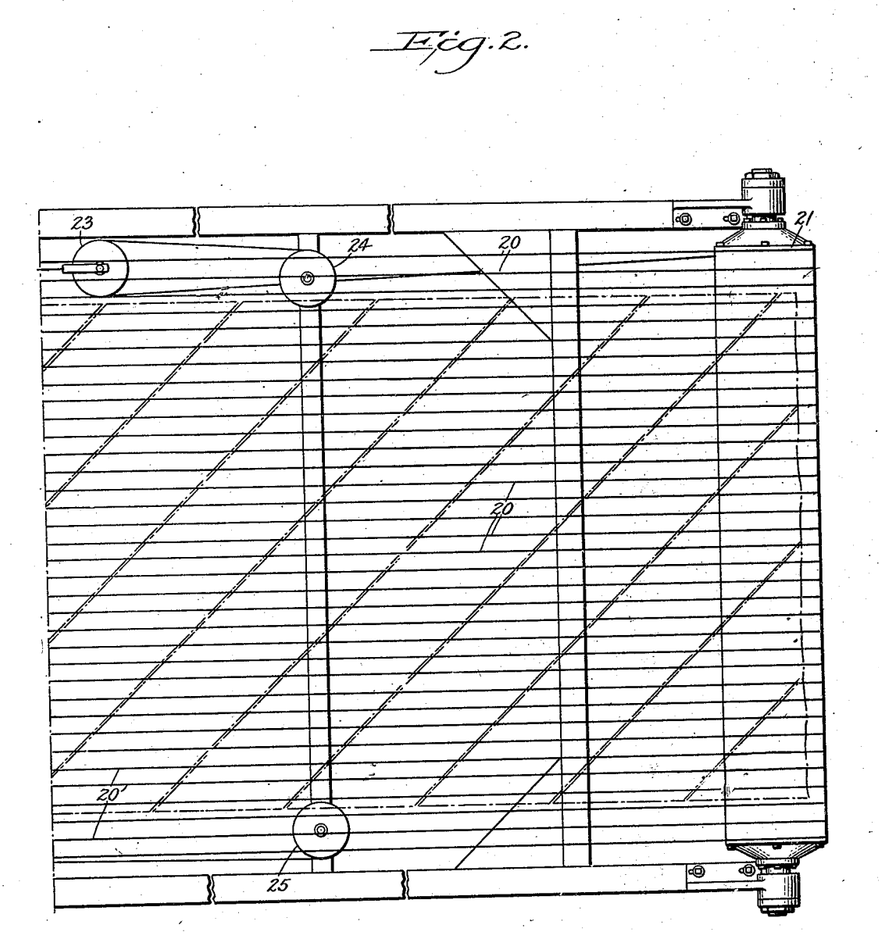
Figure 2 is a partial plan view of the receiving apron completing the view of Figure 1.
Figure 3:
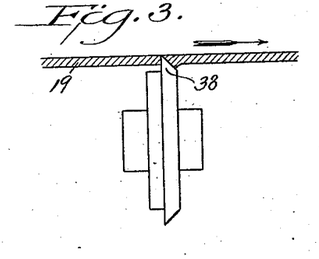
Figure 3 is a detail showing the manner in which the cutter severs the fabric.
Figure 17:
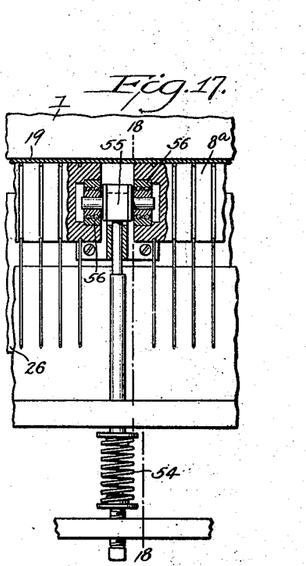
Figure 17 is a detail of the leading-out rolls, shown in partial vertical section on line 17—17 of Figure 10.
Figure 18:
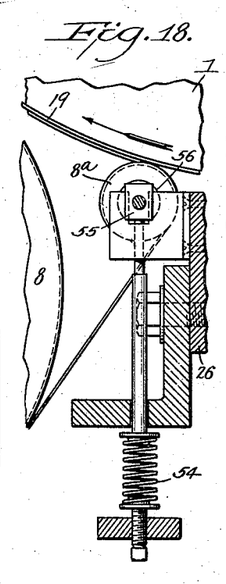
Figure 18 is a longitudinal section on line 18—18 of Figure 17.

It will be apparent from the above description that, as the roll 1 and the two auxiliary rolls 7 and 8 are geared together by the chain 13 and through intermediate mechanism with the sprockets 31 and 32 they drive the chain 30 and its connected cutter and inking carriers 27 and 28 so that the fabric as it passes under the roll will be cut diagonally into bias strips, the width of which strips will be determined by the spacing apart of the cutter carriers and their cutters and the angle of the bias by the relative motion of the roll and the cutters. The disk cutters will, therefore, be set at this angle in their carriers and the printing disk will also be set at the same angle. The printing disk being midway between the cutting disks will print a central line in the middle of each bias strip. The inking disks are provided also with transverse printing lugs 41$^a$, which will print along the central line a scale of marks, as shown in Figure 13$^a$. The object of the printing of the central line and of the scale of marks is to enable the operator that is building the tire to place the strip centrally on the tire mold or the tire carcass and the object of the printed scale is to enable him to see that the stretching which occurs mostly at the medium line is uniform around the periphery of the tire. The disk cutters as shown in Figure 3, have one straight edge normal to their axis and one beveled edge. The object of making the cutters in this form is twofold. A cutter beveled on one side will always cut true to a certain line no matter how it is ground in sharpening, whereas a cutter having a bevel on both sides, if ground more on one side than the other, will no longer cut true to the medium line. Such a beveled cutter in cutting through an elastic fabric of appreciable thickness has a tendency to buckle or rumple the edge of the fabric next to the beveled surface of the cutter as shown in Figure 3, and it is desirable that any such rumpling of the fabric be confined to one side of the cut strip namely to that side which is trailing. The leading edge of the cut strip will, therefore, be more easily fed in between the rolls or the feeding mechanism and will not tend to fold up or otherwise cause distortion. To more surely guide the cut strips onto the delivery supports, I may provide mechanism as follows: Interpolated between the grooves carrying the cables 20 on the roll 8 are intermediate grooves as shown in Figure 1, around which is wound a cord which alternately passes over the roll 8 and over a smaller roll 8$^a$, close to the cutter guides. The roll 8$^a$ is also grooved corresponding with the roll 8 and is pressed up against the fabric by means of springs 54 (see Figures 17 and 18) acting against the vertically sliding journal supports 55 which, through ball bearings 56, carry the rolls 8$^a$. The leading edges of the strips as they leave the cutters are gripped between the rolls 8$^a$ and the roll 1 and are led therefrom onto the roll 8 and from thence onto the supporting cables 20, resting in the position shown by dot and dash lines in Figure 2.

Figure 19:
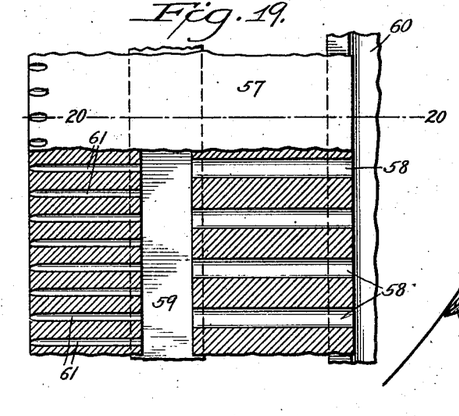
Figure 19 is a section through the pneumatic separating blade.
Figure 20:
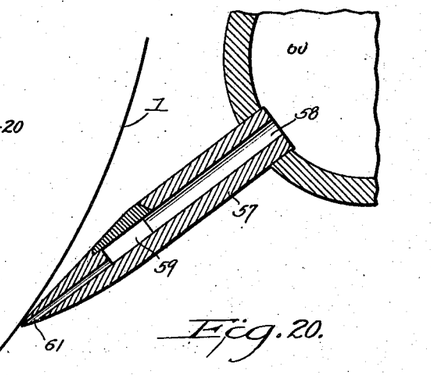
Figure 20 is a section of the same on line 20—20 of Figure 19.

In order to insure the sticky fabric leaving the roll as it passes between the same and roll 8, I provide a supporting blade 57. This blade has a sharpened edge which cuts along the surface of the roll to insure the separation of the fabric from the roll. The blade, however, is made hollow by having a series of holes 58 drilled in it which, through a longitudinal slot 59, leads compressed air from the supporting pipe 60 to a series of jet holes 61. Compressed air is supplied to pipe 60 and issuing from jets 61 impinges on the upper surface of the fabric and causes the same to leave the roll as a rule, even before it reaches the knife blade. This essentially insures that the upper surface of the sticky fabric will be entirely freed from contact with any solid substance.

Figure 21:
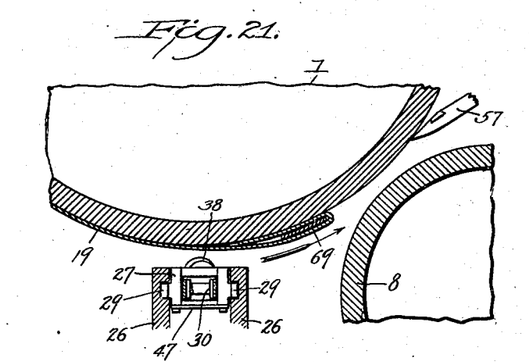
Figure 21 is a section illustrating the means whereby the fabric is fed into the machine.
Figure 22:
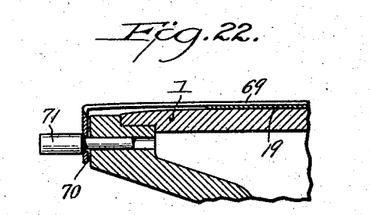
Figure 22 is a partial section through the feeding drum at right angles to that of Figure 1, on the line 22—22 of Figure 23.
Figures 23, 24:
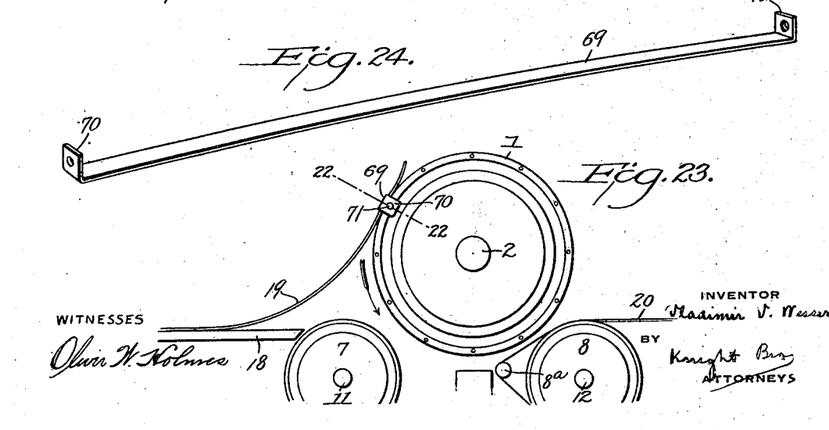
Figure 23 is a side elevation illustrating the manner of feeding the fabric onto the drum.
Figure 24 is a perspective view of the clip used to fasten the end of the fabric to the drum for feeding.

To feed the fabric into the machine, the roll is mounted in vertically moving supports 4, which also carry bracket arms 62 that support the air pipe 60. A shaft 63 at the lower end of these supports, journalled in bearings 64 in the main frame has eccentrics 65 turning in blocks 66, adjustably secured by screws 67 in the vertically sliding supports 4. A crank 68 on the end of the shaft 63 enables the operator, through the mechanism just described, to lift the roll a short distance sufficient to allow the passage between the roll and the cutters of the beginning of the strip. When it is desired to feed the end of the fabric into the machine, use is made of a bar of metal 69 (see Figure 24) which has upturned perforated ends 70. The end of the fabric is folded around this bar (as shown in Figures 21 and 23) and the ends of the bar 69 are secured by pins 71 to the ends of the drum. The drum is then rotated a short distance until the end of the strip comes to a point beyond the contacting point of the rolls 1 and 8 when the bar 69 is removed and the calendar roll lowered into position by operating crank 68, thus bringing the cutters into position to cut through the fabric and impinge against the roll and the printing disks to contact with the fabric.

Immediately under the guides 26 an ordinary inking roller 72 is rotatably supported in the frame of the machine and underneath it, an iron inking roll 73 is similarly pivoted. The soft roll 72 comes in contact with the inking roll 73 and also in contact with the inking disks 46, which transfer the ink to the printing disks 41. The roll 73 is rotated by means of a sprocket 74 on one end of its shaft, which is driven by sprocket chain 75 from a sprocket wheel 76 mounted on the calender roll. An idler sprocket 77, through the medium of spring 78 (see Figure 9) and connecting rods 79, maintain a yielding tension on the sprocket chain and allow of sufficient freedom of play so that no undue strain will be involved by the lifting of the calender roll. The inking roll 73 is supplied intermittently with ink from a soft inking roll 80 rolling in contact with an inking roll 81 and moved from said roll 81 to roll 73 intermittently by means of rocking arm 82, connecting rod 83, bell crank 84 and shaft 85, which is operated through bell crank 86 and connecting rod 87 from bell crank 88 mounted on the shaft of roll 7. An ink trough 89 of the usual construction, supplies ink to roll 81, which is rotated by a ratchet wheel 90 from an eccentric 91 in the usual manner of printing presses.

Figures 4, 5, 6:
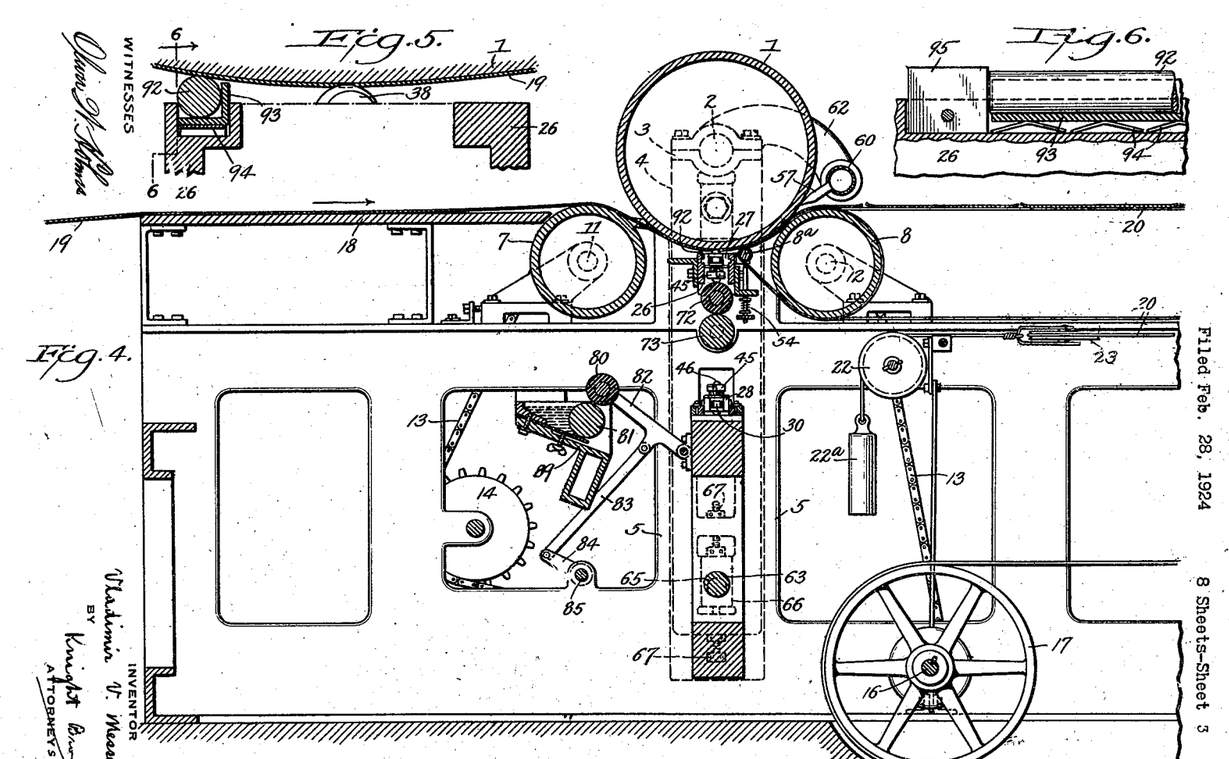
Figure 4 is a longitudinal vertical section of the machine, on line 4—4 of Figure 1.
Figure 5 is a detail of the feeding-in roller.
Figure 6 is a longitudinal section of the same on line 6—6 of Figure 5.

In order to prevent any side shift of the fabric, I provide the device shown in Figure 5, which consists of a roller 92 carried by angle 93 in a slot in the guide 26 on the incoming side. This roller 92 is pressed upward against the fabric by means of springs 94 under the angle (see Figure 6) and is held from end motion by blocks 95. The fabric is thus gripped so firmly between this roller 92 and the calender roll 1 as to be insured against slipping sidewise.

While I have described herein apparatus for printing upon fabric, I do not make claims upon the devices herein, as such devices will form the subject of a separate application.

I claim:—

1. In a machine of the class described, in combination, a rotatable roll, having an uninterrupted surface, a cutter adapted to impinge on the surface of the roll, a stationary guide for the cutter parallel to the axis of the roll, and means exterior to the roll for moving the cutter longitudinally along the roll synchronously with the rotation of the guide whereby fabrics fed continuously over the roll may be continuously cut in diagonal lines.

2. In a machine of the class described, in combination, a rotatable roll having an uninterrupted surface, a plurality of spaced cutters adapted to impinge on the surface of the roll, a stationary guide for the cutters parallel to the axis of the roll, an endless carrier on which said cutters are attached at fixed distances apart, and means exterior to the roll for moving the carrier and cutters longitudinally along the guide synchronously with the rotation of the roll whereby fabrics fed continuously over the roll may be continuously cut in diagonal lines.

3. In a machine of the class described, in combination, a rotatable roll having an uninterrupted surface, a plurality of spaced rotatable disk cutters adapted to have their edges ride on the surface of the roll, a stationary guide for the cutters parallel to the axis of the roll, and means exterior to the roll for moving the cutters longitudinally along the guide synchronously with the rotation of the roll whereby fabrics fed continuously over the roll may be continuously cut in diagonal lines.

4. In a machine of the class described, in combination, a rotatable roll having an uninterruped surface, a plurality of spaced cutter carriers articulated together at fixed intervals, each carrier having a rotatable cutter adapted to impinge on the surface of the roll, a stationary guide for the cutters parallel to the axis of the roll, and means exterior to the roll for moving the cutter carriers longitudinally along the guide synchronously with the rotation of the roll whereby fabrics fed continuously over the roll may be continuously cut in diagonal lines.

5. In a machine of the class described, in combination, a rotatable roll having an uninterrupted surface, a plurality of spaced cutter carriers articulated together in an endless chain, each carrier having a rotatable cutter adapted to impinge on the surface of the roll, a stationary guide for the cutters parallel to the axis of the roll, and means exterior to the roll for moving the cutter carriers longitudinally along the guide synchronously with the rotation of the roll whereby fabrics fed continuously over the roll may be continuously cut in diagonal lines.

6. In a machine of the class described, in combination, a rotatable roll having an uninterrupted surface, a plurality of spaced cutter carriers articulated together, each carrier having a rotatable cutter adapted to impinge on the surface of the roll, stationary guides for the carriers parallel to the roll, and means exterior to the roll for moving the cutter carriers longitudinally along the guides synchronously with the rotation of the roll whereby fabrics fed continuously over the roll may be continuously cut in diagonal lines.

7. In a machine of the class described, in combination, a rotatable roll, a plurality of spaced cutter carriers articulated together, each carrier having a rotatable cutter and resilient means adapted to press the cutter to the roll, guides for the carriers parallel to the roll, and means for moving the cutter carriers longitudinally along the guides synchronously with the rotation of the roll.

8. In a machine of the class described, in combination, a rotatable roll, a plurality of spaced cutter carriers articulated together, each carrier having a rotatable cutter adapted to impinge on the roll, guides for the carriers parallel to the roll, means for moving the cutter carriers longitudinally along the guides, and means for raising the roll free of the cutters.

9. In a machine of the class described, a fabric carrying roll, a rotatable cutter with its axis inclined to the axis of the roll having a flat face normal to its axis and a bevelled face meeting the flat face at the cutting edge, the said edge being adapted to impinge on the surface of the roll with the flat side of the cutter normal to the surface of the roll and opposed to the direction of feed whereby rumpling of the fabric is avoided.

10. In a machine of the class described, in combination, a rotatable roll, adapted to feed a friction fabric over a part of its periphery, cutters adapted to impinge on the roll and cut the fabric into bias strips, means for moving the cutters longitudinally along the roll synchronously with the rotation of the roll, and a blade impinging on the roll, said blade having air passages for delivering jets of air between the roll and fabric to insure the separation of the fabric from the roll.

11. In a machine of the class described, in combination, a rotatable cylinder, adapted to feed a friction fabric over a part of its periphery, cutters adapted to impinge on the cylinder and cut the fabric into bias strips, means for moving the cutters longitudinally along the cylinder synchronously with the rotation of the cylinder, a receiving roll between which and the cylinder the friction fabric is fed after being cut and means for holding the fabric in contact with the cylinder until it reaches the point where it is pinched between the cylinder and the roll.

12. In a machine of the class described, in combination, a rotatable cylinder adapted to feed a friction fabric over a part of its periphery, cutters adapted to impinge on the cylinder and cut the fabric into bias strips, means for moving the cutters longitudinally along the cylinder synchronously with the rotation of the cylinder, a receiving roll between which and the cylinder the friction fabric is fed after being cut, and means for holding the fabric in contact with the cylinder until it reaches the point where it is pinched between the cylinder and the roll, said means comprising a roll of small diameter near the cutters and a cord wound over said roll of small diameter and the receiving roll.

13. In a machine of the class described, in combination, a rotatable cylinder having an uninterrupted surface over which a fabric may be fed, a device adapted to act on the fabric and means exterior to the cylinder for moving said device longitudinally along the cylinder synchronously with the rotation of the cylinder.

VLADIMIR V. MESSER.